United States Patent
Weis (10) Patent No.: US 10,434,346 B1
(45) Date of Patent: Oct. 8, 2019

(54) FIREFIGHTING TRAINING APPARATUS AND METHOD

(71) Applicant: Draft Commander, LLC, Salina, KS (US)

(72) Inventor: Gary L Weis, Salina, KS (US)

(73) Assignee: Draft Commander, LLC, Salina, KS (US)

( * ) Notice: Subject to any disclaimer, the term of this patent is extended or adjusted under 35 U.S.C. 154(b) by 0 days.

(21) Appl. No.: 16/192,739

(22) Filed: Nov. 15, 2018

(51) Int. Cl.
| | |
|---|---|
| G09B 19/00 | (2006.01) |
| A62C 99/00 | (2010.01) |
| A62C 31/05 | (2006.01) |
| G09B 19/24 | (2006.01) |
| G09B 9/00 | (2006.01) |
| A62C 31/28 | (2006.01) |

(52) U.S. Cl.
CPC .......... *A62C 99/0081* (2013.01); *A62C 31/05* (2013.01); *A62C 31/28* (2013.01); *G09B 9/00* (2013.01); *G09B 19/24* (2013.01)

(58) Field of Classification Search
USPC ............................................ 434/226; 73/168
See application file for complete search history.

(56) References Cited

U.S. PATENT DOCUMENTS

| | | | |
|---|---|---|---|
| 6,386,049 B1 | 5/2002 | Schrumm | |
| 7,017,406 B1 | 3/2006 | Cressman | |
| 7,244,123 B1 * | 7/2007 | Barron | G09B 9/00 |
| | | | 220/562 |
| 7,827,860 B2 | 11/2010 | Weis | |
| 8,302,470 B2 * | 11/2012 | Earle | A62C 27/00 |
| | | | 73/198 |
| 9,709,465 B2 | 7/2017 | Alexander | |
| 9,903,783 B2 | 2/2018 | Henderson et al. | |
| 2006/0240392 A1 * | 10/2006 | Clifton | A62C 99/0081 |
| | | | 434/226 |
| 2009/0248324 A1 * | 10/2009 | Hamilton | A62C 37/50 |
| | | | 702/47 |
| 2013/0252213 A1 * | 9/2013 | Gridley | G09B 19/00 |
| | | | 434/226 |
| 2015/0079559 A1 * | 3/2015 | Blackburn | A62C 99/0081 |
| | | | 434/226 |

\* cited by examiner

*Primary Examiner* — Kurt Fernstrom
(74) *Attorney, Agent, or Firm* — Jeffrey L. Thompson; Thompson & Thompson, P.A.

(57) ABSTRACT

A firefighting training apparatus includes a tank having a tank outlet and a tank inlet, and a cuboid-shaped receptacle mounted on top of the tank. The receptacle has an open rear side, a closed front side, a planar top side, and a bottom side with a sump connected to the tank inlet. The closed front side has a vertical lower portion and an angled upper portion connected to the top side. A plane containing the angled upper portion forms an acute angle with the top side to help disperse training fluid within the receptacle. A plurality of flow dividers are provided on the closed front side to further disperse training fluid being sprayed through the open rear side into the receptacle. The tank with the open-sided receptacle mounted on top is supported by a mobile trailer to facilitate transporting the training apparatus to a training site.

23 Claims, 6 Drawing Sheets

FIREFIGHTING TRAINING APPARATUS AND METHOD

BACKGROUND OF THE INVENTION

Field of the Invention

The present invention relates generally to equipment used for training firefighters. In particular, the present invention relates to a firefighting training apparatus and method for training firefighters to spray water efficiently, accurately and with minimal waste under simulated firefighting conditions.

Description of the Related Art

Fire fighting equipment, such as fire trucks, are typically equipped with one or more onboard pumps capable of drawing water from a water source and pumping the water under high pressure through fire hoses for spraying onto fires. The water source for the pumps can be a pond, river, swimming pool, fire hydrant, or other available water supplies that can be drawn into the pump at a high flow rate (e.g., 500 to 3,000 gpm).

Standardized testing procedures have been developed for testing pumps used with fire fighting equipment to determine whether the pumps perform at their rated capacities. For example, the National Fire Protection Association has developed a recommended standard pump testing procedure, referred to as NFPA 1911 (2017 Standards), for testing water pumps associated with fire fighting equipment. The testing procedure requires a pump to be tested at various flow rates for predetermined lengths of time, which results in vast quantities of water to be pumped through the equipment. Fire hydrants alone are generally not capable of supplying fresh water at the high flow rates necessary for the length of time necessary to conduct the pumping tests.

Applicant developed a mobile fire pump testing unit several years ago that allows high flow and high pressure fire pump tests to be performed from draft with clean clear water with minimal waste. The Applicant's mobile fire pump testing unit is sold under the proprietary name, DRAFT COMMANDER®, and is disclosed in U.S. Pat. No. 7,827,860 issued to Gary L. Weis on Nov. 9, 2010. The mobile fire pump testing unit provides many functions besides fire pump testing, including training operations of the fire engine pump and different evolutions of flowing water while using the same water over and over.

However, the mobile fire pump testing unit disclosed in the '860 patent does not provide the capability to conduct firefighter hands-on training to simulate fighting an actual fire while firefighters operate various types of nozzles and pumps.

SUMMARY OF THE INVENTION

It is an object of the present invention to provide a firefighting training apparatus that can be used together with a mobile fire pump testing unit to provide firefighter hands-on training to simulate fighting an actual fire while operating various types of nozzles and pumps and monitoring pumping conditions.

It is a further object of the present invention to provide a firefighting training apparatus that collects training fluid sprayed from nozzles and recycles the training fluid back into a tank from which the training fluid is pumped.

It is a further object of the present invention to provide a firefighting training apparatus that has a generally cuboid-shaped receptacle positioned above a tank to receive training fluid sprayed from nozzles and return the training fluid back into the tank.

It is a further object of the present invention to provide a firefighting training apparatus that has a generally cuboid-shaped receptacle with flow dividers and inclined surfaces for dispersing training fluid within the receptacle and collecting the training fluid in a sump to return the training fluid back into the tank.

It is a further object of the present invention to provide a firefighting training apparatus with a tank and open-sided receptacle mounted on a mobile trailer to facilitate transporting the training apparatus to a training site.

To accomplish these and other objects of the present invention, a firefighting training apparatus is provided having a tank with a tank outlet and a tank inlet, and a cuboid-shaped receptacle positioned on top of the tank. The receptacle has an open rear side, a closed front side, a planar top side, and a bottom side with a sump connected to the tank inlet. The closed front side has a vertical lower portion and an angled upper portion connected to the top side. A plane containing the angled upper portion forms an acute angle with the top side to help disperse training fluid within the receptacle. A plurality of flow dividers are provided on the closed front side to further disperse training fluid being sprayed through the open rear side into the receptacle. The tank is mounted on a mobile trailer to facilitate transporting the training apparatus to a training site, and the open-sided receptacle is mounted on top of the tank on the trailer.

According to one aspect of the present invention, a firefighting training apparatus is provided, comprising: a tank; at least one tank outlet associated with the tank for drawing a training fluid out of the tank to supply to a firefighting nozzle; at least one tank inlet associated with the tank; and an open-sided receptacle positioned above the tank. The receptacle has a bottom side with a sump connected to the tank inlet for returning training fluid back into the tank. The receptacle also has an open first side and a closed second side opposite the open first side. The closed second side comprises a plurality of flow dividers facing the open first side to disperse training fluid being sprayed through the open first side into the receptacle, thereby causing the training fluid to flow to the sump and return back into the tank with minimal waste.

According to another aspect of the present invention, a firefighting training apparatus is provided, comprising: a tank; at least one tank outlet associated with the tank for drawing a training fluid out of the tank to supply to a firefighting nozzle; at least one tank inlet associated with the tank; and an open-sided, cuboid-shaped receptacle positioned above the tank. The receptacle has a bottom side with a sump connected to the tank inlet for returning training fluid back into the tank. The receptacle also has an open first side, a closed second side opposite the open first side, a planar top side and right and left sides. The closed second side comprises a vertical lower portion and an angled upper portion connected to the top side. A plane containing the angled upper portion forms an acute angle with the top side, whereby the angled upper portion helps disperse training fluid within the receptacle to minimize waste.

According to another aspect of the present invention, a method of training firefighters is provided, comprising: providing a tank containing a supply of training fluid, a tank outlet and a tank inlet; providing an open-sided receptacle on top of the tank, the receptacle having a bottom side with a sump connected to the tank inlet for returning training fluid from the receptacle back into the tank, the receptacle having an open first side and a closed second side opposite the open first side; connecting a pump to the tank outlet; operating the pump to draw training fluid from the tank through the tank outlet and supply training fluid under pressure to at least one firefighting nozzle; and spraying training fluid from the at least one firefighting nozzle through the open first side into the receptacle. The training fluid from the firefighting nozzle is received by the receptacle and returned back into the tank through the sump and the tank inlet to minimize waste during training.

Numerous other objects of the present invention will be apparent to those skilled in this art from the following description wherein there is shown and described embodiments of the present invention, simply by way of illustration of modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the present invention is made with reference to the accompanying drawings. In the drawings.

DETAILED DESCRIPTION OF THE INVENTION

A firefighting training apparatus 10 according to the present invention will now be described in detail with reference to FIGS. 1 to 8 of the accompanying drawings.

Figure 1:
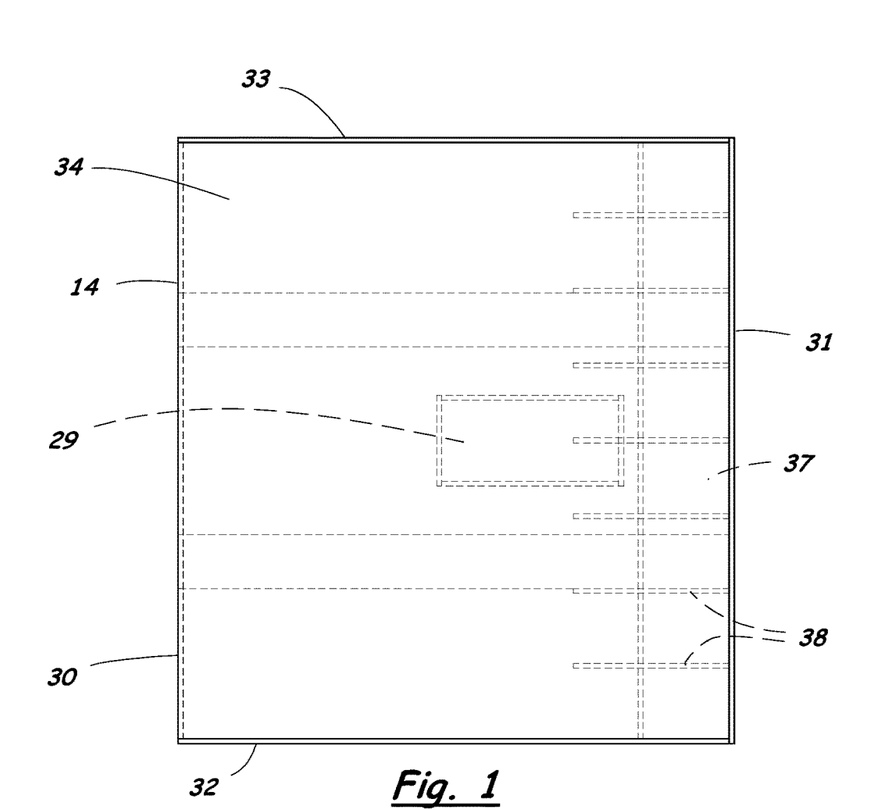
FIG. 1 is a top plan view of a receptacle for a firefighting training apparatus according to the present invention.
Figure 2:
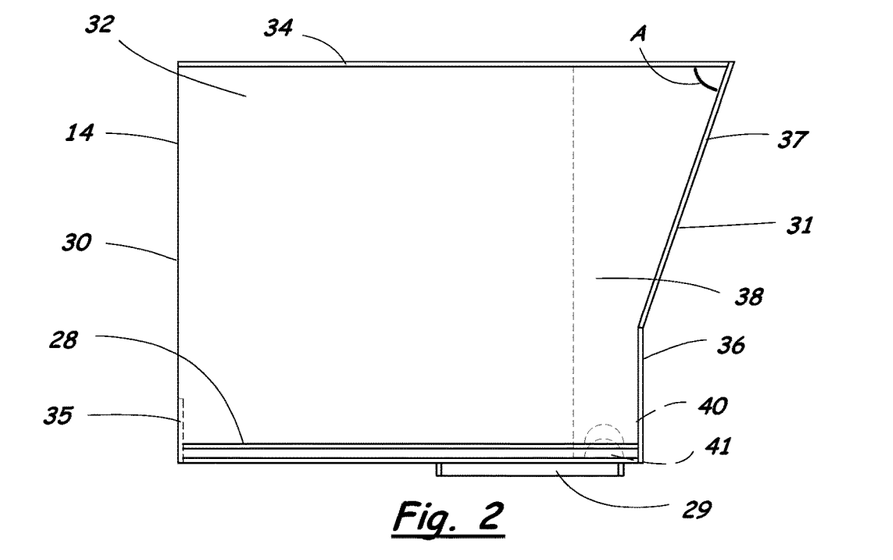
FIG. 2 is a side elevation view of the receptacle shown in FIG. 1.
Figure 3:
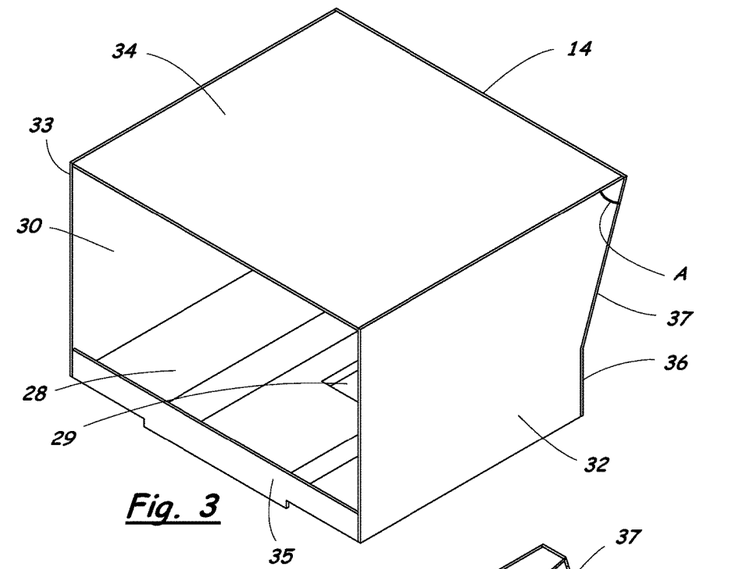
FIG. 3 is a perspective rear view of the receptacle.
Figure 4:
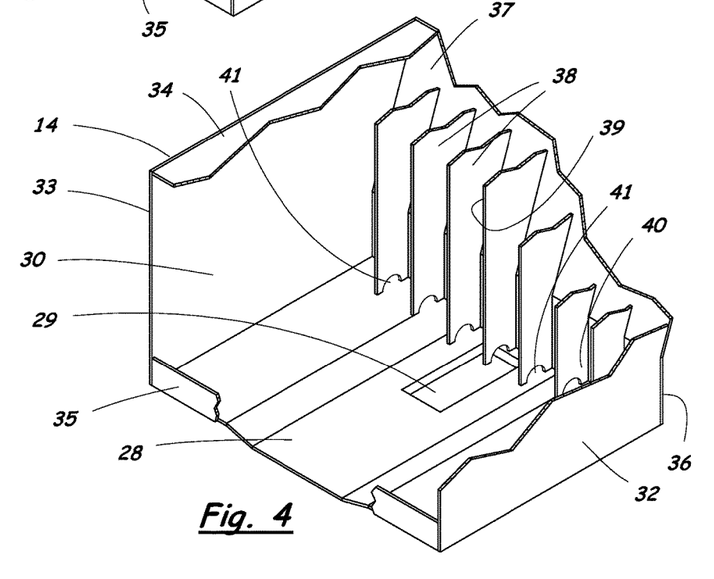
FIG. 4 is a partial cutaway perspective rear view of the receptacle.
Figure 5:
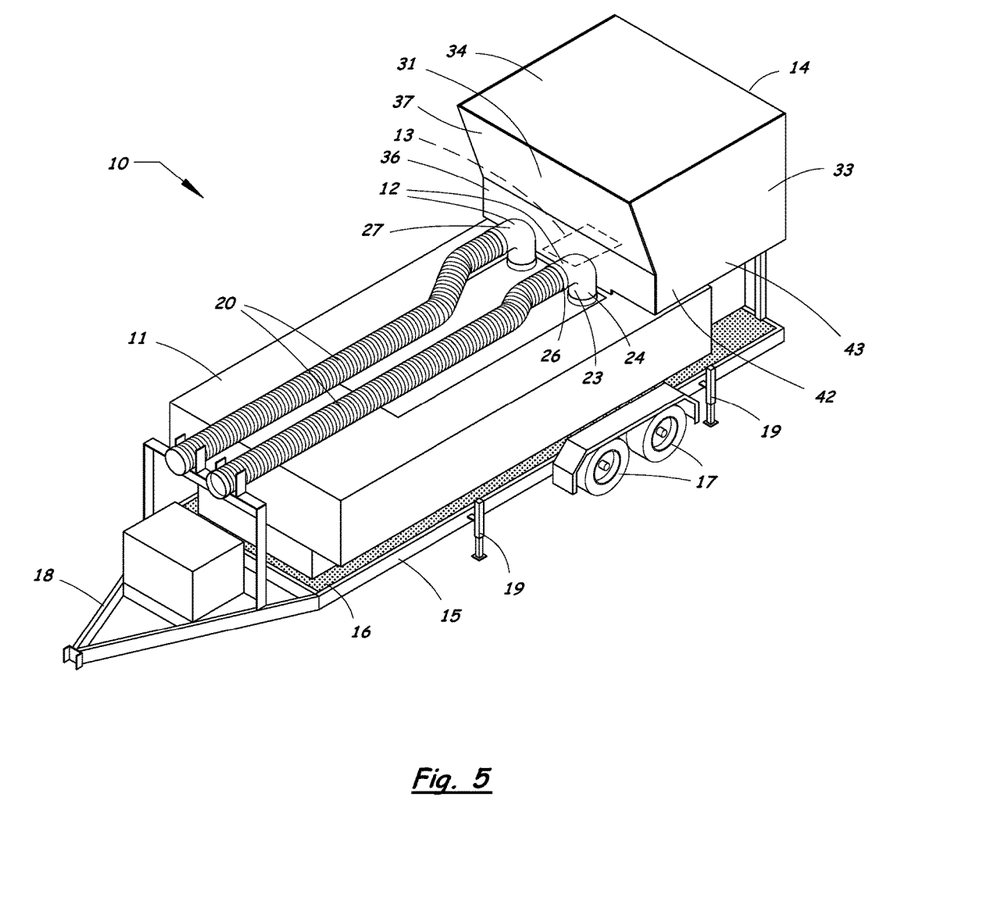
FIG. 5 is a perspective view of the firefighting training apparatus on a mobile trailer.
Figure 6:
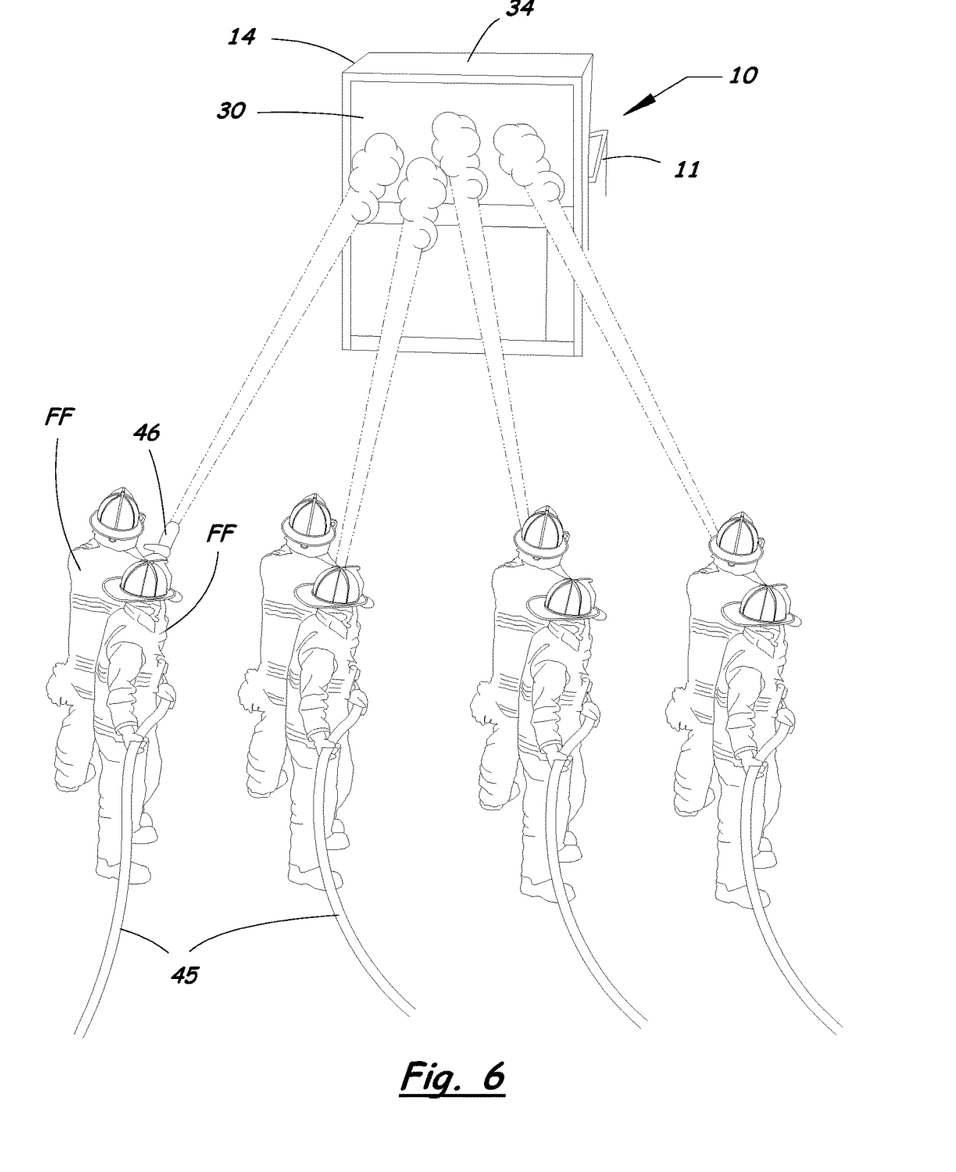
FIG. 6 is an illustration showing a group of firefighters spraying water into the open rear side of the receptacle.

As illustrated in FIG. 5, the firefighting training apparatus 10 includes a tank 11, a pair of tank outlets 12 associated with the tank 11 for drawing training fluid (e.g., water) out of the tank 11, and a tank inlet 13 located under a receptacle 14 mounted on top of the tank 11. The tank 11 is mounted on a mobile trailer 15 to facilitate transporting the training apparatus 10 to a training site. The mobile trailer 15 has a platform 16 supported by a plurality of wheels 17 and a hitch 18 at the front end. Stabilizing jacks 19 are provided along the sides of the trailer 15 to support and stabilize the trailer when the tank 11 is parked and filled with training fluid.

At the training site, the tank 11 can be filled with training fluid, and the draft hoses 20 connected to the tank outlets 12 can be connected to a pump 21 on a firefighting apparatus, such as a fire truck 22. The tank outlets 12 each comprise a draft tube 23 that passes through a top side 24 of the tank 11 and has an open lower end near a bottom of the tank 11 for drawing water out of the lower part of the tank 11. The draft tube 23 has a vertical portion 24 that extends into the tank 11, and a horizontal portion 26 connected to the vertical portion 24 by an elbow structure 27. The draft tube 23 is rotatable about a vertical axis to change the direction of the horizontal portion 26 to facilitate connecting the tank outlet 12 to a pump 21 on a firefighting apparatus 22.

The tank 11 comprises a fluid baffle system for removing cavitations from the training fluid circulating within the tank 11 between the tank inlet 13 and the tank outlets 12 during use. A cooling system is provided for cooling the water in the tank 11 to maintain a desired water temperature during pump testing procedures. The fluid baffle system and cooling system can have the same structure as described and illustrated in Applicant's prior U.S. Pat. No. 7,827,860, the content of which is hereby incorporated by reference. The tank 11 is preferably constructed to accommodate a water flow rate within a range of 500 to 3,000 gallons per minute through the tank outlets 12 and the tank inlet 13.

The receptacle 14 is illustrated in detail in FIGS. 1 to 4. The receptacle 14 has a bottom side 28 with a sump 29 connected to the tank inlet 13 for returning training fluid back into the tank 11. The bottom side 28 is sloped so that the training fluid drains to the sump 29. The receptacle 14 is generally cuboid shaped and has an open rear side 30, a closed front side 31 opposite the rear side 30, right and left vertical sides 32, 33, and a top side 34. A raised lip 35 is provided across a rear edge of the bottom side 28 to prevent training fluid from spilling out of the open rear side 30 of the receptacle 14.

The front side 31 has a vertical lower portion 36 and an angled upper portion 37 connected to the top side 34. A plane containing the angled upper portion 37 forms an acute angle (A) with the top side 34. In the illustrated embodiment, the acute angle (A) is approximately 70 degrees. However, it is contemplated that an acute angle within a range of approximately 50 to 80 degrees could be used. The angled upper portion 37 helps trap and disperse training fluid within the receptacle 14 during use to cause the training fluid to collect in the sump 29 and return into the tank 11 to minimize waste.

A plurality of flow dividers 38 are provided on the closed front side 31 of the receptacle 14. The flow dividers 38 comprise vertical plates spaced across the closed front side 31. The vertical plates 38 each have an edge 39 facing the open rear side 30 of the receptacle 14. The vertical plates 38 have lower ends 40 with cutouts 41 to facilitate fluid flow toward the sump 29 in the center of the bottom side 28. The flow dividers 38 function to disperse training fluid being sprayed through the open rear side 30 into the receptacle 14, thereby causing the training fluid to flow to the sump 29 and return back into the tank 11 with minimal waste.

The receptacle 14 is mounted on top of the tank 11 with the open side 30 facing rearwardly on the trailer 15 to allow firefighters FF located behind the trailer 15 to spray training fluid into the receptacle 14. The receptacle 14 has a front portion 42 positioned over the tank 11, and a rear portion 43 extending behind the tank 11. The tank inlet 13 comprises an opening in the top side of the tank 11, and the sump 29 comprises an opening located in the front portion 42 of the receptacle 14 arranged above the tank inlet 13 opening. The training fluid sprayed into the receptacle 14 is thus collected in the sump 29 at the bottom of the receptacle 14 and discharged from the sump 29 into the tank inlet 13 opening.

Figure 7:
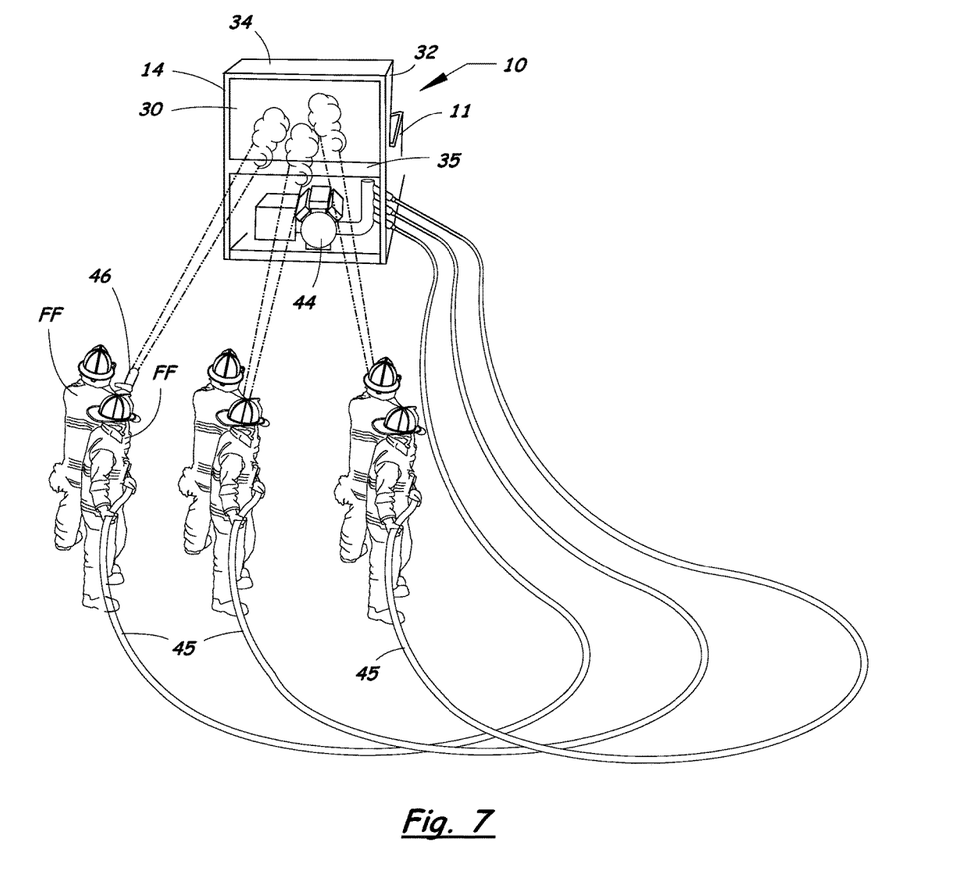
FIG. 7 is an illustration showing a group of firefighters spraying water into the open rear side of the receptacle, with the water being pumped by a self-contained pumping unit located on the mobile trailer.

As illustrated in FIG. 7, a self-contained firefighting pumping unit 44 can be mounted on the trailer 15 and connected to one of the tank outlets 12. The pumping unit 44 can be operated to draw water out of the tank through a tank outlet, and at least one hose 45 can be connected to a discharge side of the pumping unit 44 to supply training fluid under pressure to at least one firefighting nozzle 46. The training fluid can then be sprayed by the at least one firefighting nozzle 46 into the open-sided receptacle 14. In the illustrated embodiment, three hoses 45 are connected to the pumping unit 44 to supply training fluid under pressure to three firefighting nozzles 46.

The firefighting training apparatus 10 according to the present invention is described above. A method of training firefighters using the training apparatus 10 will now be described.

The training apparatus 10 is transported to a testing/training site with the tank 11 empty by towing the trailer 15 behind a vehicle. The trailer 15 is then parked and the stabilizing jacks 19 are lowered at the sides of the trailer 15 to help support the trailer with a full tank of water. The tank 11 is then filled with water from a water hydrant or other local water supply.

The training apparatus 10 can be used in a number of ways. As shown in FIG. 7, the self-contained pumping unit 44 mounted on the trailer 15 can be used to draw water out of the tank 11 and supply water under pressure to a plurality of hoses 45 with firefighting nozzles 46 attached. Firefighters FF can then hold the hoses 45 and nozzles 46 and spray water into the open rear side 30 of the receptacle 14. The water sprayed from the nozzles 46 is dispersed within the receptacle 14, flows into the sump 29 at the bottom of the receptacle 14, and is discharged back into the tank 11.

Figure 8:
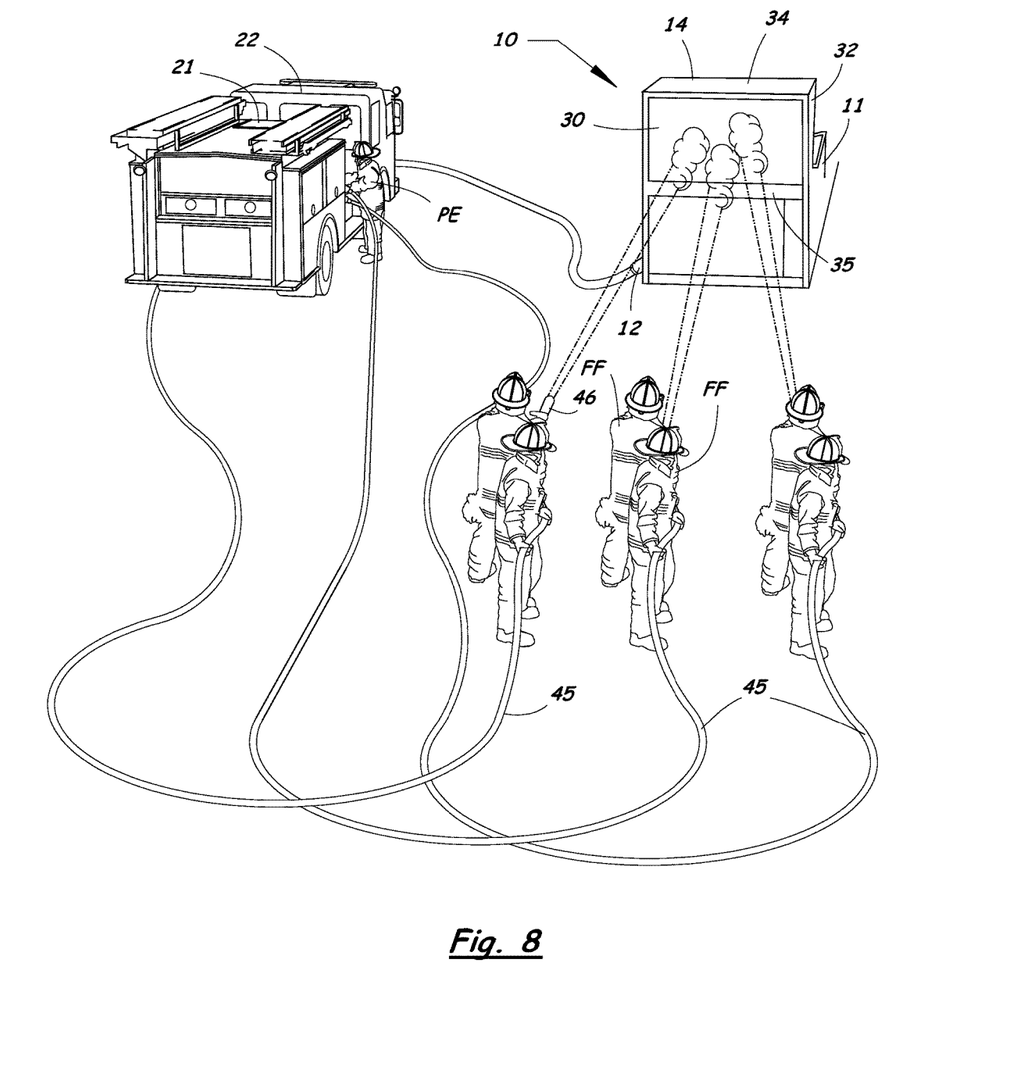
FIG. 8 is an illustration showing a group of firefighters spraying water into the open rear side of the receptacle, with the water being drafted from the tank on the training apparatus and pumped by a fire truck with a fire pump engineer monitoring the pump panel.

As shown in FIG. 8, the tank outlet can be connected to a pump 21 on a fire truck 22 to allow a group of firefighters FF to simulate firefighting conditions using the equipment that will be available to them at an actual fire. The firefighters FF will hold the hoses 45 and nozzles 46 and spray water into the open rear side 30 of the receptacle 14. The water sprayed from the nozzles 46 will then be dispersed within the receptacle 14, flow into the sump 29 at the bottom of the receptacle 14, and discharge back into the tank 11. The water will then be reused by drafting the water back out of the tank 11 through the tank outlet by the pump on the fire truck 22.

A fire pump engineer PE can also be trained during the simulated firefighting conditions shown in FIG. 8. The fire pump engineer PE has the responsibility of operating the pumps and monitoring pumping conditions on the fire truck pump panel. For example, the fire pump engineer PE can monitor the flow rates and pressures for the water being supplied to the hoses 45, and can make adjustments as needed to optimize the water spray from the nozzles 46.

In both arrangements shown in FIGS. 7 and 8, the water sprayed from the firefighting nozzles 46 is received by the receptacle 14 and returned back into the tank 11 through the sump 29 and the tank inlet 13 to minimize waste during training.

The training apparatus 10 of the present invention gives the ability to train fire pump engineers to simulate pumping from a fire hydrant with incoming residual pressure; conduct firefighter hands-on training to simulate fighting an actual fire while firefighters operate various types of handline and/or stationary nozzles that discharge water back into the receptacle; perform fire pump service tests from draft with a fire apparatus equipped with fire pumps according to national standards; and test a variety of handline and stationary fire nozzles for pressure and flow rate accuracy.

While the invention has been specifically described in connection with specific embodiments thereof, it is to be understood that this is by way of illustration and not of limitation, and the scope of the appended claims should be construed as broadly as the prior art will permit.

What is claimed is:

1. A firefighting training apparatus, comprising:
 a tank;
 at least one tank outlet associated with the tank for drawing a training fluid out of the tank to supply to a firefighting nozzle;
 at least one tank inlet associated with the tank; and
 an open-sided receptacle positioned above the tank, said receptacle having a bottom side with a sump connected to the tank inlet for returning training fluid back into the tank, said open-sided receptacle comprising an open first side and a closed second side opposite said open first side, said closed second side comprising a plurality of flow dividers facing said open first side to disperse training fluid being sprayed through the open first side into the receptacle, thereby causing the training fluid to flow to the sump and return back into the tank with minimal waste.

2. The firefighting training apparatus according to claim 1, wherein said receptacle is generally cuboid shaped and comprises a top side and right and left sides.

3. The firefighting training apparatus according to claim 2, wherein said top side is planar, said second side comprises a vertical lower portion and an angled upper portion connected to said top side, and a plane containing said angled upper portion forms an acute angle with said top side, whereby said angled upper portion helps disperse training fluid within the receptacle to minimize waste.

4. The firefighting training apparatus according to claim 3, wherein said flow dividers comprise vertical plates spaced across the closed second side, and wherein said vertical plates each have an edge facing the open first side of the receptacle.

5. The firefighting training apparatus according to claim 4, wherein said vertical plates have lower ends with cutouts to facilitate fluid flow toward the sump in said bottom side.

6. The firefighting training apparatus according to claim 1, wherein said at least one tank outlet comprises a draft tube that passes through a top side of the tank and has an open lower end near a bottom of the tank for drawing water out of the lower part of the tank.

7. The firefighting training apparatus according to claim 6, wherein said draft tube has a vertical portion that extends into the tank and a horizontal portion connected to the vertical portion by an elbow structure, said draft tube being rotatable about a vertical axis to change the direction of the horizontal portion to facilitate connecting the tank outlet to a pump on a firefighting apparatus for supplying training fluid to the firefighting nozzle.

8. The firefighting training apparatus according to claim 1, wherein said tank comprises a fluid baffle system for removing cavitations from the training fluid circulating within the tank between said tank inlet and said tank outlet during use.

9. The firefighting training apparatus according to claim 1, wherein said tank is mounted on a mobile trailer to facilitate transporting the training apparatus to a training site, and said open-sided receptacle is mounted on top of said tank.

10. The firefighting training apparatus according to claim 9, wherein said open-sided receptacle is arranged with said open first side facing rearwardly on said trailer to allow firefighters located behind the trailer to spray training fluid into the receptacle.

11. The firefighting training apparatus according to claim 10, wherein said receptacle has a front portion positioned over said tank and a rear portion extending behind said tank, said tank inlet comprises a first opening in a top side of the tank, and said sump comprises a second opening located in the front portion of said receptacle and arranged above said first opening in the tank to discharge training fluid from said receptacle into said tank.

12. The firefighting training apparatus according to claim 1, wherein said tank inlet comprises a first opening in a top side of the tank, and wherein said sump comprises a second opening arranged above said first opening to discharge training fluid from said receptacle into said tank.

13. The firefighting training apparatus according to claim 1, wherein said training fluid is water.

14. The firefighting training apparatus according to claim 1, further comprising a firefighting pump mounted on the trailer and connected to said tank outlet, and at least one hose connected to a discharge side of said firefighting pump to supply training fluid under pressure to at least one firefighting nozzle, whereby said training fluid can be sprayed by said at least one firefighting nozzle into said open-sided receptacle.

15. The firefighting training apparatus according to claim 1, wherein said open-sided receptacle and said tank are constructed to accommodate a waterflow rate within a range of 500 to 3,000 gallons per minute through said at least one tank outlet and said at least one tank inlet.

16. A firefighting training apparatus, comprising:
a tank;
the tank to supply to a firefighting nozzle;
at least one tank inlet associated with the tank; and
an open-sided, cuboid-shaped receptacle positioned above the tank, said receptacle having a bottom side with a sump connected to the tank inlet for returning training fluid back into the tank, said receptacle comprising an open first side and a closed second side opposite said open first side, said receptacle comprising a planar top side and right and left sides, said closed second side comprising a vertical lower portion and an angled upper portion connected to said top side, and a plane containing said angled upper portion forms an acute angle with said top side, whereby said angled upper portion helps disperse training fluid within the receptacle to minimize waste.

17. The firefighting training apparatus according to claim 16, wherein said closed second side comprises a plurality of flow dividers facing said open first side to diffuse training fluid being sprayed through the open first side into the receptacle, whereby said flow dividers help further disperse training fluid within the receptacle to minimize waste.

18. The firefighting training apparatus according to claim 17, wherein said flow dividers comprise vertical plates spaced across the closed second side, and wherein said vertical plates each have an edge facing the open first side of the receptacle.

19. The firefighting training apparatus according to claim 18, wherein said vertical plates have lower ends with cutouts to facilitate fluid flow toward the sump in said bottom side.

20. The firefighting training apparatus according to claim 16, wherein said tank is mounted on a mobile trailer to facilitate transporting the training apparatus to a training site, and said open-sided receptacle is mounted on top of said tank and arranged with said open first side facing rearwardly on said trailer to allow firefighters located behind the trailer to spray training fluid into the receptacle.

21. The firefighting training apparatus according to claim 20, further comprising a firefighting pump mounted on the trailer and connected to said tank outlet, and at least one hose connected to a discharge side of said firefighting pump to supply training fluid under pressure to at least one firefighting nozzle, whereby said training fluid can be sprayed by said at least one firefighting nozzle into said open-sided receptacle.

22. A method of training firefighters, comprising:
providing a tank containing a supply of training fluid, a tank outlet and a tank inlet;
providing an open-sided receptacle on top of said tank, said receptacle having a bottom side with a sump connected to the tank inlet for returning training fluid from the receptacle back into the tank, said receptacle having an open first side and a closed second side opposite said open first side;
connecting a pump to the tank outlet;
operating the pump to draw training fluid from the tank through the tank outlet and supply training fluid under pressure to at least one firefighting nozzle; and
spraying training fluid from the at least one firefighting nozzle through the open first side into the receptacle, wherein training fluid from the firefighting nozzle is received by the receptacle and returned back into the tank through the sump and the tank inlet to minimize waste during training.

23. The method according to claim 22, wherein said receptacle is cuboid shaped and comprises flow dividers positioned within the receptacle to disperse training fluid being sprayed into the receptacle to minimize waste.

* * * * *